United States Patent
Muharemovic et al.

(10) Patent No.: US 7,933,342 B2
(45) Date of Patent: Apr. 26, 2011

(54) MULTIPATH EQUALIZATION FOR MIMO MULTIUSER SYSTEMS

(75) Inventors: Tarik Muharemovic, Richardson, TX (US); Eko Onggosanusi, Dallas, TX (US); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2594 days.

(21) Appl. No.: 10/173,282

(22) Filed: Jun. 17, 2002

(65) Prior Publication Data

US 2003/0026345 A1 Feb. 6, 2003

Related U.S. Application Data

(60) Provisional application No. 60/298,785, filed on Jun. 15, 2001.

(51) Int. Cl.
*H04K 1/10* (2006.01)
*H04L 27/28* (2006.01)
(52) U.S. Cl. ......... 375/260; 375/346; 375/347; 375/349
(58) Field of Classification Search .......... 375/260, 375/346–350
See application file for complete search history.

(56) References Cited

U.S. PATENT DOCUMENTS

| | | | | |
|---|---|---|---|---|
| 5,646,964 A | * | 7/1997 | Ushirokawa et al. | 375/346 |
| 5,761,237 A | * | 6/1998 | Petersen et al. | 375/148 |
| 6,658,047 B1 | * | 12/2003 | Komulainen et al. | 375/150 |
| 6,721,293 B1 | * | 4/2004 | Komulainen et al. | 370/335 |
| 6,785,341 B2 | * | 8/2004 | Walton et al. | 375/267 |
| 2001/0043572 A1 | * | 11/2001 | Bilgic et al. | 370/281 |
| 2002/0051433 A1 | * | 5/2002 | Affes et al. | 370/335 |
| 2002/0126741 A1 | * | 9/2002 | Baum et al. | 375/144 |
| 2002/0141518 A1 | * | 10/2002 | Piirainen | 375/346 |
| 2003/0035469 A1 | * | 2/2003 | Frank et al. | 375/150 |
| 2003/0035491 A1 | * | 2/2003 | Walton et al. | 375/267 |
| 2003/0095529 A1 | * | 5/2003 | Petre et al. | 370/342 |

OTHER PUBLICATIONS

Tsai et al. "Hybrid MMSE and SIC for Multiuser Detection", VTC 2001 Spring. IEEE VTS 53rd Vehicular Technology Conference. vol. 3 of 4. Conf 53.6 May 2001 pp. 1779-1783, XP001082449, ISBN: 0-7803-6728-6.*

* cited by examiner

*Primary Examiner* — Curtis B Odom
(74) *Attorney, Agent, or Firm* — Ronald O. Neerings; Wade James Brady, III; Frederick J. Telecky, Jr.

(57) ABSTRACT

Interference rejection (85) can be applied to a wireless communication signal with reduced computational complexity by producing from a sample vector (y) a plurality of vectors (w) that are smaller than the sample vector. The interference rejection operation can then be applied to each of the smaller vectors individually to decide communication symbols represented by the sample vector.

57 Claims, 7 Drawing Sheets

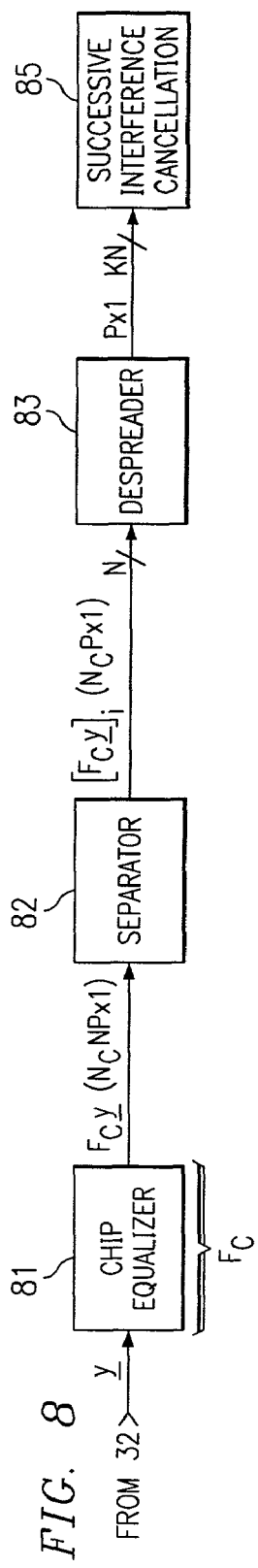
FIG. 8
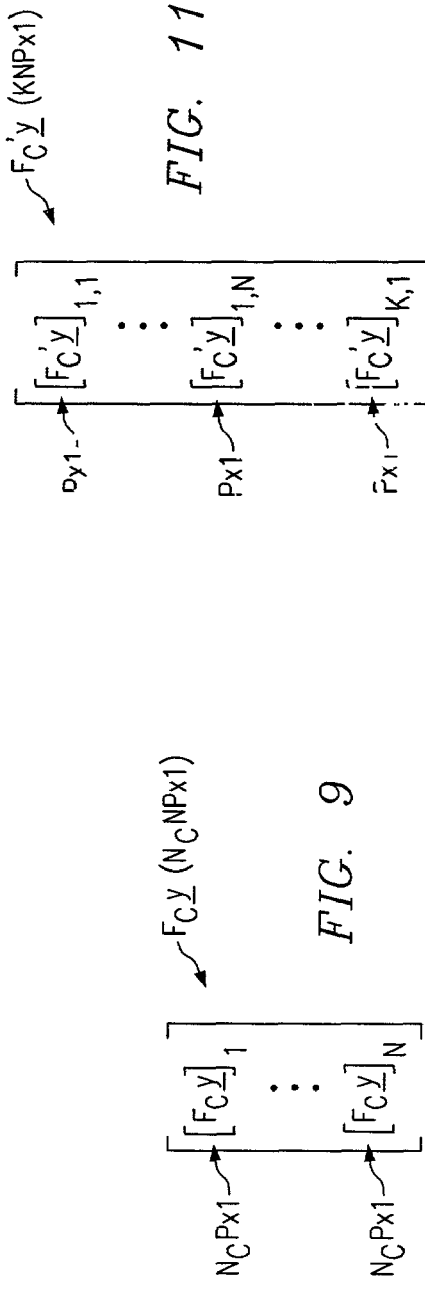
FIG. 9
FIG. 11
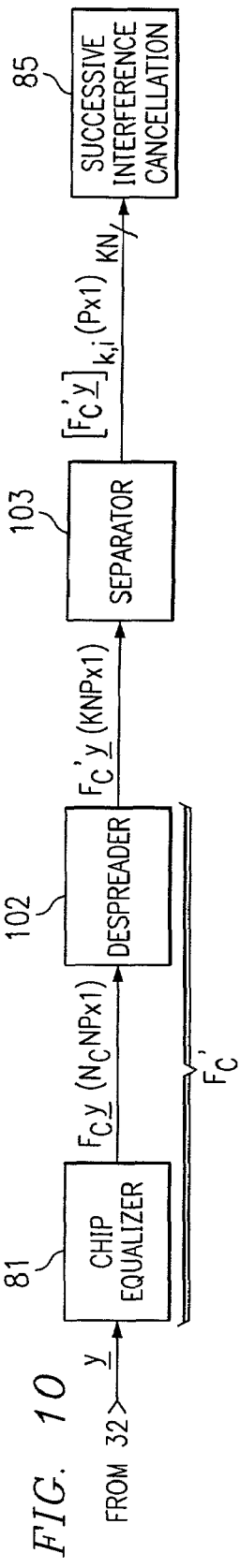
FIG. 10

FIG. 18

| EMBODIMENTS | CONTROL INFORMATION AT 171 | INFORMATION PRODUCED BY 161 | | | | |
|---|---|---|---|---|---|---|
| | | | T | $\hat{T}$ | $(\hat{T}^H\hat{T}+I)^{-1}$ | $(T^HT+I)^{-1}$ |
| FIG. 8 | $F_C$ AND H FROM 81; $D_i(k)$ FROM 83 | C | $D_i(k) C_i D_i^H(k)$ | YES | YES | NO |
| FIG. 10 | $F_C$ AND H FROM 81; $S_k^H$ FROM 102 | $C_i$ | $\hat{B}_i$ | YES | YES | NO |
| FIG. 12 | $G_C(i)$ FROM 129 | NOT NEEDED | $G_C(i)$ | NO | NO | YES |
| FIG. 13 | $F_M$ AND $\alpha$ FROM 130 | $C_i$ | $R_i$ | YES | YES | NO |
| FIG. 15 | $G_M(k,i)$ FROM 159 | NOT NEEDED | $G_M(k,i)$ | NO | NO | YES |
| | ↑ 172 | | ↑ 171 | ↑ 173 | ↑ 174 | ↑ 175 |
| | | | | CONTROL INPUTS AT 166 | MMSE ONLY | |

MULTIPATH EQUALIZATION FOR MIMO MULTIUSER SYSTEMS

This application claims the priority under 35 U.S.C. 119 (e)(1) of U.S. provisional application No. 60/298,785, filed on Jun. 15, 2001, and incorporated herein by reference.

FIELD OF THE INVENTION

The inventions relates generally to wireless communications and, more particularly, to wireless CDMA communications.

BACKGROUND OF THE INVENTION

Copending U.S. Ser. No. 10/107,275 filed on Mar. 26, 2002 discloses subject matter related to that disclosed herein, and is incorporated herein by reference. Symbols $C_k$, $s_k$, $\Psi$ and r, as used in incorporated U.S. Ser. No. 10/107,275, correspond respectively to $S_k$, $b_k$, H and y as used herein.

FIG. 1 diagrammatically illustrates an example of a conventional CDMA transmitter apparatus. As shown in FIG. 1, the communication data is first applied to a channel encoding section 11 whose output is then fed to a channel interleaver 12. The output of the channel interleaver 12 is input to a modulator 13, for example a QPSK modulator or an M-QAM modulator. The modulator 13 outputs communication symbols to a MIMO/ST (multiple input-multiple output/space-time) coding section 14. The output of the MIMO/ST coding section 14 is input to a multi-antenna spreading section 15 which drives a plurality of transmit antennas. Examples of space-time (ST) coding at 14 include STTD, double STTD and OTD coding.

FIG. 2 illustrates examples of the MIMO/ST coding section 14 and spreading section 15 of FIG. 1 in more detail. As show in FIG. 2, the MIMO/ST coding section 14 includes a plurality of MIMO transformers which perform MIMO transforms on communication symbols received from the modulator 13. Each MIMO transformer receives symbols associated with one of K specific sources. The K sources can be associated with K different users, or can be associated with a single user, or one or more groups of the sources can be associated with one or more respective users while the rest of the sources are individually associated with other users. Assuming P transmit antennas, each MIMO transformer produces P outputs, and all KP outputs are applied to the multi-antenna spreading section 15. For each of the P outputs provided by one of the K MIMO transformers, the multi-antenna spreading section 15 applies one of K spreading codes to those P outputs. The signals that result from application of the spreading codes are then combined by P combiners as shown for transmission on the P transmit antennas.

FIG. 3 diagrammatically illustrates an exemplary portion of a conventional CDMA receiver which can receive the signals transmitted by the conventional transmitter of FIGS. 1 and 2. As shown in FIG. 3, signals received by a plurality of antennas are sampled at the chip rate (sampling could also be done above the chip rate). With $N_C$ chips per symbol, and a symbol detection window size of N symbols, the sampling section 32 of FIG. 3 collects a total of $N_C \times N$ chips per detection window, as illustrated at 31 and 33 in FIG. 3. The received signal y of FIG. 3 can be expressed as follows:

$$y = \sum_{k=1}^{K} \sqrt{\rho_k} \, H_k S_k b_k + n \qquad (1)$$

or, in matrix form:

$$y = \begin{bmatrix} y_1(0) \\ y_2(0) \\ \vdots \\ y_Q(0) \\ \vdots \\ y_1(N_cN-1) \\ y_2(N_cN-1) \\ \vdots \\ y_Q(N_cN-1) \end{bmatrix} \qquad (2)$$

where Q is the number of receive antennas, and Q>P. In equation 1 above, the matrix $H_k$ represents the transmission channel associated with the kth source (which is known, e.g., from conventional channel estimation procedures), $\rho_k$ is the power of the kth source, $S_k$ is the spreading code matrix for the kth source, $b_k$ is the data symbol vector for the kth source and n is white noise. The dimension of the received signal vector y is $N_cNQ \times 1$, the channel matrix $H_k$ is a $N_cNQ \times N_cNP$ matrix, the spreading code matrix $S_k$ is a $N_cNP \times NP$ matrix, and the vector $b_k$ has a dimension of $NP \times 1$.

The data symbol vector $b_k$ can be written in matrix form as follows:

$$b_k = \begin{bmatrix} b_{k,1}(0) \\ b_{k,2}(0) \\ \vdots \\ b_{k-P}(0) \\ \vdots \\ b_{k,1}(N-1) \\ b_{k,2}(N-1) \\ \vdots \\ b_{k,P}(N-1) \end{bmatrix} \qquad (3)$$

where k is the index in equation 1 for the K sources of FIG. 1, P is the number of transmit antennas, and 0 to N−1 represent the N symbols in the symbol detection window. Rewriting a portion of equation 1 as follows:

$$\sqrt{\rho_k} H_k S_k = A_k \qquad (4)$$

then equation 1 can be further rewritten as follows:

$$y = [A_1 \cdots A_K] \begin{bmatrix} b_1 \\ \vdots \\ b_K \end{bmatrix} + n \qquad (5)$$

Equation 5 above can in turn be rewritten in even more generalized format as follows:

$$y = ab + n \qquad (6)$$

The goal is to solve for the vector b. One way to do so is conventional multi-user detection with the linear zero forcing (LZF) solution (see also FIG. 4) given by:

$$z = F_{MZ}y = (a^H a)^{-1} a^H y = b + (a^H a)^{-1} a^H n \quad (7)$$

wherein z has a vector format as follows:

$$z = \begin{bmatrix} z_1 \\ \vdots \\ z_K \end{bmatrix} \quad (8)$$

and wherein the components of z have the following format $$z_k = \begin{bmatrix} z_{k,1}(0) \\ z_{k,2}(0) \\ \vdots \\ z_{k,P}(0) \\ \vdots \\ z_{k,1}(N-1) \\ Z_{k,2}(N-1) \\ \vdots \\ Z_{k,P}(N-1) \end{bmatrix} \quad (9)$$

and wherein $$\begin{bmatrix} z_{k,1}(0) \\ z_{k,2}(0) \\ \vdots \\ z_{k,P}(0) \end{bmatrix} \equiv z_k(0), \begin{bmatrix} z_{k,1}(1) \\ z_{k,2}(1) \\ \vdots \\ z_{k,P}(1) \end{bmatrix} \equiv z_k(1), \text{ etc.,}$$

so equation 9 can also be written as $$z_k = \begin{bmatrix} z_k(0) \\ z_k(1) \\ \vdots \\ z_k(N-1) \end{bmatrix} \quad (10)$$

Multiplying through equation 6 by $a^H$ gives:

$$a^H y = a^H a b + a^H n \quad (11)$$

The superscript "H" herein designates the conjugate and transpose operation. Neglecting the noise in equation 11 gives:

$$a^H y = a^H a b \quad (12)$$

Therefore, an estimate, $\hat{b}$ of the vector b is given by:

$$\hat{b} = (a^H a)^{-1} a^H \underline{y} = \begin{bmatrix} \hat{b}_1 \\ \vdots \\ \hat{b}_K \end{bmatrix} \quad (13)$$

This estimate $\hat{b}$ represents the solution as:

$$\hat{b} = z; \hat{b}_k = z_k; \text{ and } \hat{b}_k(n) = z_k(n) \quad (14)$$

for k=1, . . . K and n=0, . . . N−1

For downlink scenarios, the channels experienced by all the sources from the base station to a mobile unit are common. That is, $H_k = H$ for k=1, . . . , K. In this case, chip equalization techniques can be used.

For conventional chip equalization approaches, the following vector can be defined:

$$\underline{x} = \sum_{k=1}^{K} \sqrt{\rho_k}\, S_k\, \underline{b}_k \quad (15)$$

and, substituting into equation 1:

$$y = Hx + n \quad (16)$$

Conventional chip equalization techniques can be used to equalize for the channel H in equation 16. Applying the linear zero forcing technique to equation 16 yields $$F_{cZ}y = (H^H H)^{-1} H^H y = x + \text{noise} \quad (17)$$

The zero-forcing, chip equalization operation of equation 17 above produces the output 51 in the FIG. 5 example of a conventional chip equalizer with linear zero forcing. From the output 51 in FIG. 5, the components of the vector z shown above in equation 8 can be produced by applying the appropriate despreading matrices to the output 51. Thus, for k equal 1, 2, . . . K, $$z_k = S_k^H x + \text{noise} \quad (18)$$

Using chip equalization and linear zero forcing, the components of the vector z are given by $$z_k = \sqrt{\rho_k}\, b_k + \text{noise} \quad (19)$$

Although zero-forcing criterion completely eliminates the interference among different sources, it results in excessive noise enhancement. A better criterion is minimum mean squared error (MMSE) since it optimally trades off noise enhancement and residual interference.

FIG. 6 diagrammatically illustrates an exemplary conventional multi-user detection arrangement utilizing the linear minimum mean squared error (LMMSE) solution. The background for the technique of FIG. 6 is demonstrated by the following equations 20-24. The expected values for the vectors b and n above are given by:

$$E[bb^H] = \epsilon I \quad (20)$$

$$E[nn^H] = \sigma^2 I \quad (21)$$

The LMMSE solution for multi-user detection is the function $F_{MM}$ which minimizes the expression:

$$F_{MM}^{min} E\|F_{MM}y - b\|^2 \quad (22)$$

The desired function $F_{MM}$ is $$F_{MM} = \left(a^H a + \frac{\sigma^2}{\varepsilon} I\right)^{-1} a^H \quad (23)$$

and this function $F_{MM}$ can be applied to the received signal to obtain the desired vector z as follows:

$$z = F_{MM} y \quad (24)$$

The LMMSE solution for chip equalization is given by:

$$F_{CM} = \left(H^H H + \frac{\sigma^2}{\varepsilon} I\right)^{-1} H^H \quad (25)$$

Applying the function $F_{CM}$ to the received signal, as illustrated in the conventional LMMSE chip equalizer example of FIG. 7, gives:

$$F_{CM}y = F_{CM}Hx + F_{CM}n \quad (26)$$

It is known in the art to apply iterative (i.e., successive or decision feedback) interference cancellation techniques in conjunction with multi-user detection or chip equalization. Iterative techniques provide improved interference cancellation, but require disadvantageously complex computations when applied to large matrices such as $F_{CZ}$, and $F_{CM}$, $F_{MZ}$ and $F_{MM}$ above. This is because of the large number (NKP) of iterations required.

It is therefore desirable to provide for iterative interference cancellation while avoiding complex matrix computations such as described above. The present invention advantageously isolates blocks of a conventional chip equalizer output, and applies interference rejection techniques to the isolated blocks to improve the symbol estimation at the receiver. The present invention also advantageously isolates blocks of a conventional multi-user detector output, and applies interference rejection techniques to the isolated blocks to improve the symbol estimation at the receiver. The block isolation advantageously reduces the complexity of the matrix calculations in the interference rejection.

BRIEF DESCRIPTION OF THE DRAWINGS

FIG. 8 diagrammatically illustrates pertinent portions of exemplary embodiments of a wireless CDMA receiver including chip equalization, block isolation and successive interference cancellation according to the invention.

FIG. 9 diagrammatically illustrates exemplary isolation operations which can be performed by the receiver of FIG. 8.

FIG. 10 diagrammatically illustrates pertinent portions of further exemplary embodiments of a wireless CDMA receiver including chip equalization, block isolation and successive interference cancellation according to the invention.

FIG. 11 illustrates exemplary isolation operations which can be performed by the receiver of FIG. 10.

FIG. 18 illustrates in tabular format inputs and outputs of the controller of FIG. 17 according to various exemplary embodiments of the invention.

DETAILED DESCRIPTION

Figure 1:
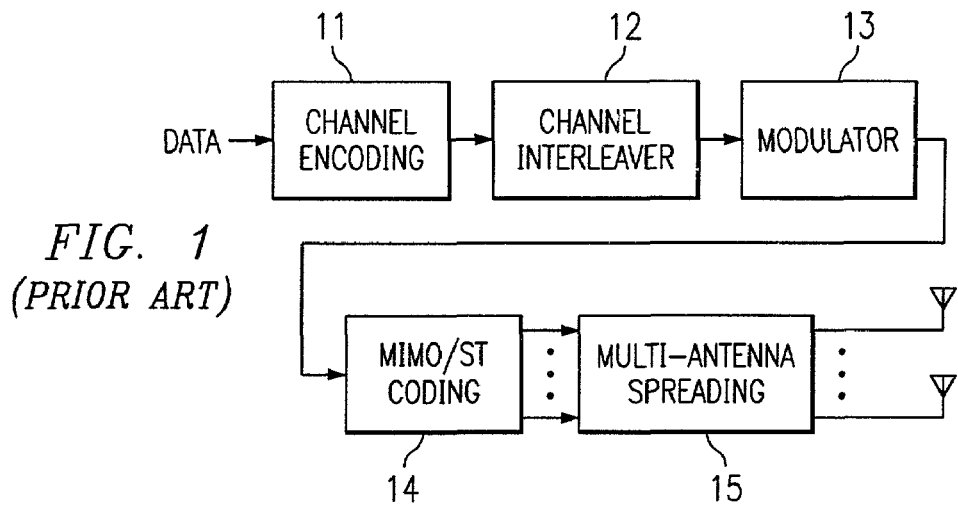
FIG. 1 diagrammatically illustrates a conventional example of a wireless CDMA transmitter.

In exemplary embodiments of a receiver input processing section according to the invention, chip equalization or multi-user detection is applied to the aforementioned vector y (see also FIG. 3), and the resulting vector is then processed appropriately to produce a plurality of much smaller vectors. Successive interference cancellation techniques can then be applied individually to each of the smaller vectors produced by the receiver input processing section, thereby reducing the computational complexity of the successive interference cancellation operation. In some embodiments, each of the smaller vectors corresponds to the P symbols of a given source that are transmitted on P transmit antennas (see also FIG. 2) during a given symbol interval.

In some exemplary chip equalization embodiments of the invention (illustrated by FIG. 8) the operation $F_C H$ (where $F_C = F_{CZ}$ or $F_{CM}$) can be expressed as follows:

$$F_C H = \underbrace{\begin{bmatrix} B_o & & & \\ & B_1 & & \\ & & \ddots & \\ & & & B_{N-1} \end{bmatrix}}_{B} + \left( F_C H - \begin{bmatrix} B_o & & & \\ & B_1 & & \\ & & \ddots & \\ & & & B_{N-1} \end{bmatrix} \right) \quad (27)$$

where $B_i$ is the i-th block on the diagonal of $F_C H$. This is chosen so that the residual interference and the signal have zero correlation for that particular block i. However, in general, other choices for B are possible with appropriate filtering afterwards. The size of each $B_i$ is $N_c P \times P$.

Combining equations (26) and (27) yields $$F_C y = Bx + (F_C H - B)x + F_C n \quad (28)$$

Let $\tilde{n} = (F_C H - B)x + F_C n$ (28A)

Isolating N blocks of B (which is block diagonal) results in $$[F_C y]_i = B_i x_i + \tilde{n}_i, \ i = 0, \ldots, N-1, \quad (29)$$

where each $[F_C y]_i$ is an $N_c P \times 1$ component of the $N_c PN \times 1$ vector $F_C y$ produced by chip equalizer 81 (also referred to herein as a linear front end detector). This isolation operation is performed at 82 in FIG. 8, and is illustrated in FIG. 9. The vector $x_i$ of equation (29) is a P×1 vector, and block $B_i$ is an $N_c P \times P$ matrix.

Now, $E[\tilde{n}_i\tilde{n}_i^H]=C_i$ is readily calculated from equations (28) and (28A). Because x and n are uncorrelated, $E[\tilde{n}\tilde{n}^H]=(F_CH-B)(F_CH-B)^H+F_CF_C^H$, and $C_i$ is simply a $(N_CP\times N_CP)$ block on the diagonal of $E[\tilde{n}\tilde{n}^H]$. $E[\tilde{x}_i\tilde{n}_i^H]=0$, because the blocks on the diagonal of $(F_cH-B)$ are 0, and $E[\tilde{x}_i\tilde{x}_i^H]=\epsilon$.

Now, at 83 in FIG. 8, a despreader despreads the N isolated blocks for every source k. For k=1, ... K, the despreader 83 multiplies each $[F_Cy]_i$ by a timewise corresponding $P\times N_CP$ portion, $D_k(i)$, of the $NP\times N_CNP$ matrix $S_k^H$. With despreading, the signal model of equation (29) yields a $P\times P$ matrix channel $(D_k(i)B_i)$ for every space symbol of each of the K sources, resulting in KN vectors of dimension $P\times 1$ (one vector for each source during each symbol time), together with associated noise $\hat{n}$ whose correlation is calculated as $D_k(i)C_iD_k(i)^H$. These KN vectors are output by despreader 83.

Successive spatial interference cancellation (zero forcing or MMSE), as described in more detail below, can then be applied to the KN vectors to produce the symbol decisions. This is done by an interference cancellation apparatus 85.

In other exemplary chip equalization embodiments shown in FIG. 10, the despreading is done at 102 before the block isolation. In such embodiments, the full matrix $S_k^H$ (for k=1, ... K) of dimension $NP\times N_cNP$ is applied to the $N_cNP\times 1$ vector $F_Cy$ at 102 to produce $F_C'y$, which includes K vectors of dimension $NP\times 1$. These K vectors (one for each source) are then separated (isolated) at 103 into KN vectors of dimension $P\times 1$, as shown in FIG. 11.

Applying the signal model of equations (27)-(29) to the FIG. 10 embodiments, $F_C$ is replaced by $F_c'=S_k^HF_C$. $F_cH$ is an $N_cNP\times NP$ matrix, so $F_c'H=S_k^HF_cH$ is an $NP\times NP$ matrix whose N diagonal blocks are $P\times P$ matrices. These N diagonal blocks are analogous to $B_i$ above, and are designated $\hat{B}_i$. The blocks $\hat{B}_i$ can be used to form a matrix $\hat{B}$ analogous to matrix B above. Also, $C_i$ can be calculated for the FIG. 10 embodiments analogously to the calculation of $C_i$ for the FIG. 8 embodiments, but with $F_c$ and B replaced by $F_c'$ and $\hat{B}$, respectively.

Figure 12:
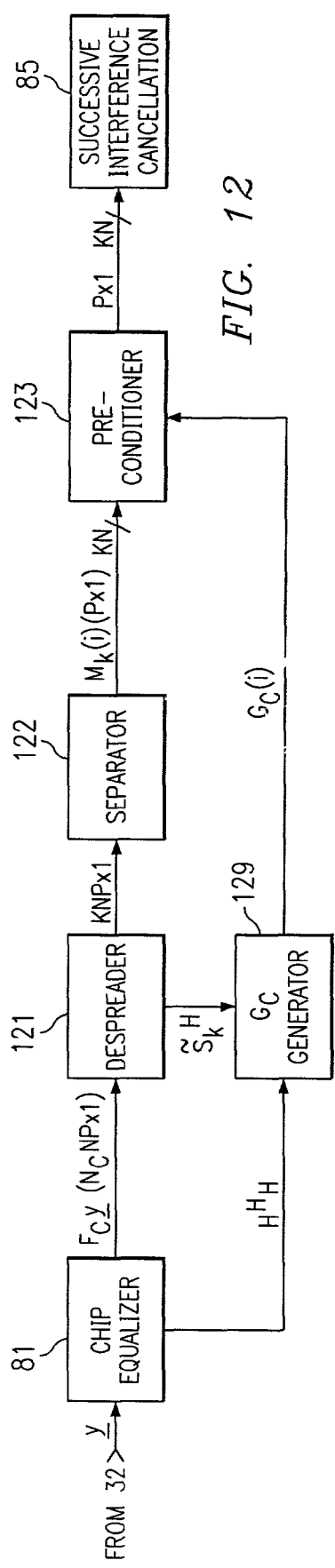
FIG. 12 diagrammatically illustrates pertinent portions of exemplary embodiments of a wireless CDMA receiver including chip equalization, block isolation, spatial channel reintroduction and successive interference cancellation according to the invention.

Other exemplary chip equalization embodiments (shown in FIG. 12) first despread at 121 by $\tilde{S}_k=I_{PN}\otimes s_k$, where $s_k$ is the spreading sequence of the k-th source and $\otimes$ is the Kronecker product:

$$\tilde{S}_kF_Cy=\tilde{S}_kF_CHx+\tilde{S}_kF_Cn, \text{ where } F_C=F_{CZ} \text{ or } F_{CM},$$

$=b_k+\hat{n}$ (an $NP\times 1$ vector where n is residual interference).

Now, at 122, a separator "isolates" one space-symbol at a time for i=1, ...,N and k=1, ... K. One space-symbol corresponds to P symbols of a given source on P transmit antennas during a given symbol time. This isolation operation (the same as performed by separator 103) yields KN vectors of dimension $P\times 1$, $$M_k(i)=b_k(i)+\hat{n}(i) \text{ (for k=1, ... K and i=1, ... N)}$$

Now, at 123, precondition (i.e. reintroduce the spatial channel) to whiten the residual interference $\hat{n}(i)$:

$$G_C(i)M_k(i)=G_C(i)b_k(i)+G_C(i)\hat{n}(i),$$

where $G_C(i)=(E[\hat{n}(i)\hat{n}(i)^H])^{-1/2}$

This $G_C(i)$ is introduced to whiten the residual interference, but any other $G_C(i)$ is possible with appropriate filtering afterwards.

For MMSE chip equalization, $$E[\hat{n}\hat{n}^H] = \tilde{S}_k^H\left(H^HH + \frac{\sigma^2}{\epsilon}I\right)^{-1}\tilde{S}_k,$$

and for zero-forcing chip equalization, the $$\frac{\sigma^2}{\epsilon}$$

I term vanishes. $E[\hat{n}\hat{n}^H]$ is an NP x NP matrix, and $E[\hat{n}(i)\hat{n}(i)^H]$ represents the N blocks of dimension $P\times P$ on the diagonal of $E[\hat{n}\hat{n}^H]$. The spatial channel matrix $G_C(i)$ is produced by $G_C$ generator 129.

Successive spatial interference cancellation (zero forcing or MMSE) is then applied at 85 to the KN vectors of dimension $P\times 1$ produced by the preconditioner 123.

Considering now exemplary multi-user detection embodiments of the invention (shown in FIG. 13), recall from equation (6) that y=ab+n, so $$\hat{b}=F_My=F_Mab+F_Mn, \text{ where } F_M=F_{MZ} \text{ or } F_{MM}.$$

Figure 13:
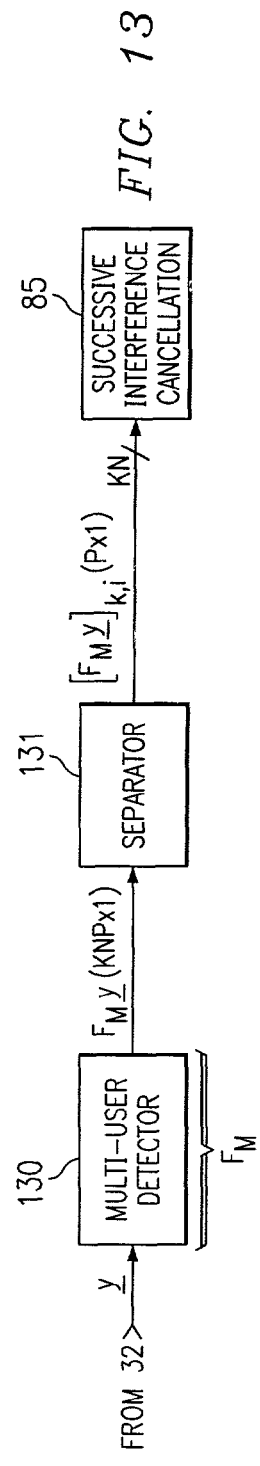
FIG. 13 diagrammatically illustrates pertinent portions of exemplary embodiments of a wireless CDMA receiver including multi-user detection, block isolation and successive interference cancellation according to the invention.

Similar to the chip-level equalizer, the embodiments of FIG. 13 isolate square blocks of size $P\times P$ on the diagonal of $F_Ma$:

$$F_My=Rb+(F_Ma-R)b+F_Mn \quad (30)$$

where $F_My$ produced by multi-user detector 130 (also referred to herein as a linear front end detector) is a $KNP\times 1$ vector, and R is similar to B above, but the diagonal of R is composed of KN blocks of dimension $P\times P$ on the diagonal of $F_Ma$.

Figure 14:
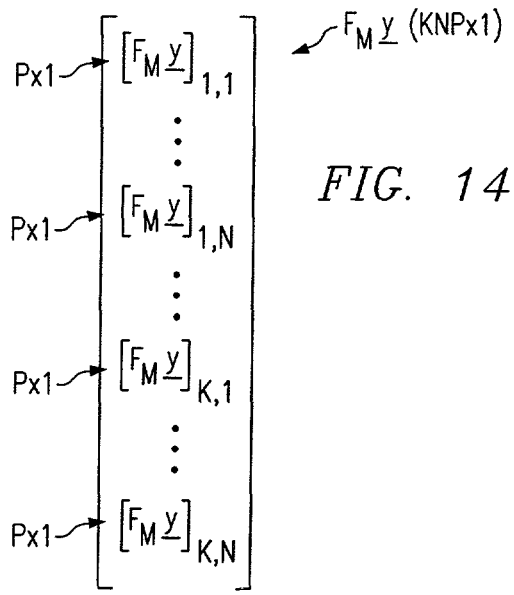
FIG. 14 illustrates exemplary isolation operations which can be performed by the receiver of FIG. 13.

Each block is now isolated, which corresponds to one space-symbol (i.e., P symbols over P antennas) of a single source, $$[F_My]_{k,i}=R_ib_{k,i}+\hat{n}_{k,i} \; i=1,\ldots,N \text{ and } k=1,\ldots K$$

where $[F_My]_{k,i}$ is a $P\times 1$ vector. The isolation operation performed on $F_My$ by separator 131 is illustrated in FIG. 14.

Also, $E[\hat{n}\hat{n}^H]=C_i$ can be readily calculated from equation (30) analogously to the calculation of $C_i$ demonstrated above relative to equation (28), namely as a $P\times P$ block on the diagonal of $(F_M-R)(F_Ma-R)^H+F_MF_M^H$.

Also, $E[b_i\hat{n}_i^H]=0$, because the blocks on the diagonal of $(F_Ma-R)$ are 0, and $E[b_ib_i^H]=\epsilon$.

Successive spatial interference cancellation can be performed with respect to each $P\times 1$ vector $[F_My]_{k,i}$ produced by separator 131.

Figure 15:
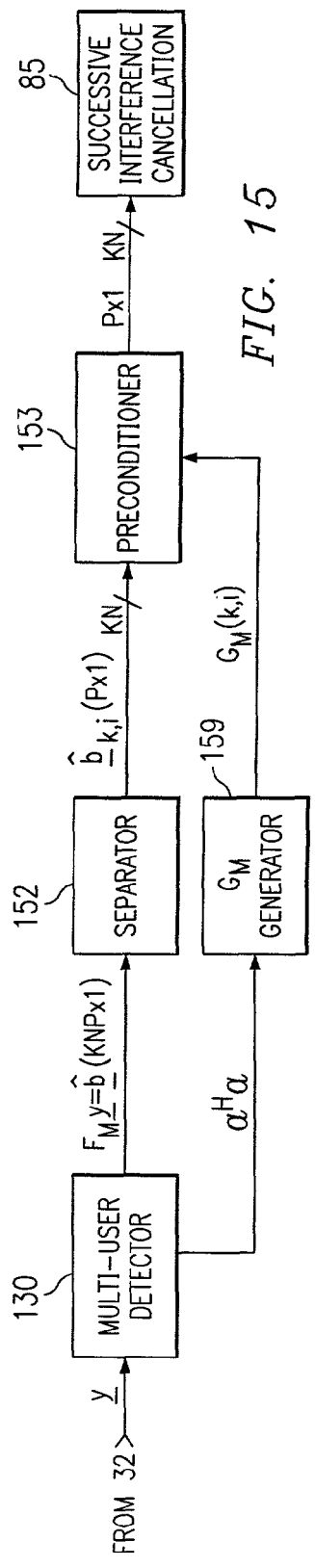
FIG. 15 diagrammatically illustrates pertinent portions of exemplary embodiments of a wireless CDMA receiver including multi-user detection, block isolation, spatial channel reintroduction and successive interference cancellation according to the invention.

In other exemplary multi-user detection embodiments (shown in FIG. 15), the expression $\hat{b}=F_Mab+F_Mn$ can be written as $$\hat{b}=b+(F_Ma-I)b+F_Mn$$

Let $\hat{n}=(F_Ma-I)b+F_Mn$

Figure 16:
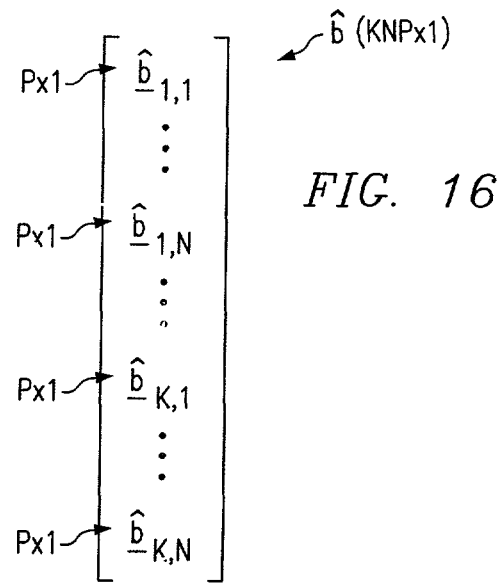
FIG. 16 illustrates exemplary isolation operations which can be performed by the receiver of FIG. 15.

Isolating a single source k, and a single time instance i, take P symbols of $\hat{b}$ (here this is done for k=1, ..., K and i=1, ...,N), and label as $\hat{b}_{k,i}$. Hence $\hat{b}$, a $KNP\times 1$ vector, is separated into KN vectors of dimension $P\times 1$, namely $\hat{b}_{k,i}=b_{k,i}+\hat{n}_{k,i}$. This separation operation, performed by separator 152, is shown in FIG. 16.

A preconditioner 153 preconditions the KN vectors $\hat{b}_{k,i}$ (i.e., reintroduces the spatial channel) with a corresponding matrix $G_M(k,i)$, so that the residual interference $\hat{n}$ is uncorrelated, i.e.

$$G_M(k,i)=(E[\hat{n}_{k,i}\hat{n}_{k,i}^H])^{-1/2}$$

$$G_M(k,i)\hat{b}_{k,i} = G_M(k,i)b_{k,i} + G_M(k,i)\hat{n}_{k,i}$$

For MMSE multi-user detection, $$E[\hat{n}\hat{n}^H] = \left(a^H a + \frac{\sigma^2}{\varepsilon}I\right)^{-1},$$

and for zero-forcing multi-user detection, the $$\frac{\sigma^2}{\varepsilon}$$

term vanishes. For multi-user detection, $E[\hat{n}\hat{n}^H]$ is a KNP×KNP matrix, and $E[\hat{n}_{k,i}\hat{n}_{k,i}^H]$ represents the KN blocks of dimension P×P on the diagonal of $E[\hat{n}\hat{n}^H]$. The spatial channel matrix $G_M(k,n)$ is produced by $G_M$ generator 159.

Successive spatial interference cancellation is performed at 85 on the KN vectors of dimension P×1 produced by the preconditioner 153. For successive spatial interference cancellation, assume a model:

$$w = Tv + n \} \text{ where v is P×1, w is P×1 and T is P×P}$$

a) for conventional zero forcing (ZF) spatial interference cancellation:
for j=1:P
  $L = (T^H T)^{-1} T^H w$
  $\hat{v}(j)$=hard decision (L(1));
  update T (essentially cross out first column of T)
  $w = w - \hat{v}(j) \times [1^{st}$ column of old T]
end b) for conventional MMSE spatial interference cancellation:
If the noise is not white, i.e., if $C \neq \sigma^2 I$, (where $C = D_i C_i D_i^H$ for chip equalization embodiments and $C = C_i$ for multi-user detection embodiments), whiten the noise first:

$$\hat{w} = C^{-1/2} w = C^{-1/2} Tv + C^{-1/2} n, \text{ where}$$

$C^{-1/2} T = \hat{T}$, and $C^{-1/2} n = \hat{n}$ (which is white). So, $\hat{w} = \hat{T}v + \hat{n}$. The procedure for MMSE successive spatial interference cancellation is then the same as for ZF above, but with w replaced by $\hat{w}$, T replaced by $\hat{T}$ and $(T^H T)^{-1}$ replaced by $(\hat{T}^H \hat{T} + I)^{-1}$.

If the noise is white, then MMSE successive spatial interference cancellation differs from ZF successive spatial interference cancellation only by replacing $(T^H T)^{-1}$ with $(T^H T + I)^{-1}$.

The Mean Squared Error (MSE) for each symbol is computed on the diagonal of $(\hat{T}^H \hat{T} + I)^{-1}$ (or the diagonal of $(T^H T + I)^{-1}$), and the algorithm can be further improved, in some embodiments, by detecting the P symbols in order of increasing MSE, instead of in the order of j=1, ... P shown above.

Figure 17:
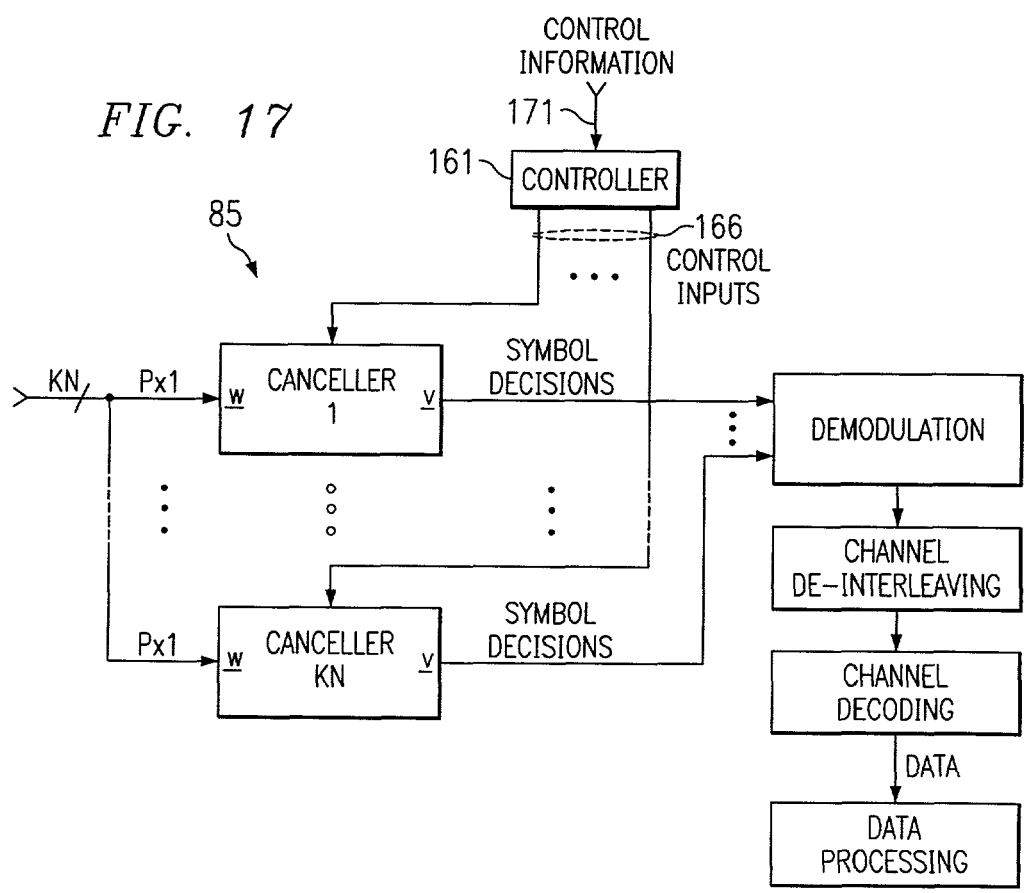
FIG. 17 diagrammatically illustrates pertinent portions of exemplary embodiments of the successive interference cancellation apparatus of FIGS. 8, 10, 12, 13 and 15.

FIG. 17 diagrammatically illustrates pertinent portions of exemplary embodiments of the successive interference cancellation apparatus 85 of FIGS. 8, 10, 12, 13 and 15. This apparatus is for processing the KN vectors of dimension P×1 produced by the embodiments of FIGS. 8, 10, 12, 13 and 15. The interference cancellation apparatus of FIG. 17 includes KN successive interference cancellers, one for each of the received P×1 vectors. Each canceller receives its associated vector at the w input thereof, and each canceller produces its symbol decisions at the v output thereof. Each canceller can perform the exemplary successive interference cancellation operations described above, either zero-forcing or MMSE, to produce the symbol decisions at the v output in response to the vector received at the w input. Each of the cancellers also receives from a controller 161 appropriate control inputs 166 for use in conjunction with the input vector to produce the symbol decisions. Advantageously, the matrix T is smaller than the matrices $F_{CZ}$, $F_{CM}$, $F_{MZ}$ and $F_{MM}$, which simplifies the matrix computations of the successive interference cancellation, as compared to conventional approaches. Further advantageously, the successive interference cancellation apparatus of FIG. 17 can process each of the KN vectors simultaneously.

FIG. 18 illustrates in tabular format examples of control information which can be provided at 171 to the controller 161 (see also FIG. 17) of the interference cancellation apparatus 85 in the various embodiments of FIGS. 8, 10, 12, 13 and 15. FIG. 18 also illustrates information produced by the controller 161 in response to the received control information. The matrix T in column 171 is provided by controller 161 as control input to each of the interference cancellers in zero-forcing interference canceller embodiments, and in MMSE interference canceller embodiments where the noise is white. The matrix C in column 172 is not provided as control input to the interference cancellers, but is used (together with T) by controller 161 in MMSE interference canceller embodiments to produce the information in columns 173 and 174. The information in columns 173 ($\hat{T}$) and 174 ($(\hat{T}^H \hat{T} + I)^{-1}$) is provided by controller 161 as control input to each of the interference cancellers in MMSE embodiments if the noise is not white, and the information in column 175 ($(T^H T + I)^{-1}$) is provided by controller 161 as control input to each of the interference cancellers in MMSE embodiments if the noise is white.

Referring again to the example of FIG. 17, the symbol decisions produced by the successive interference cancellation apparatus are provided to a data extraction apparatus which extracts the communication data from the symbol decisions. This data extraction apparatus includes a demodulation section, which is followed in turn by a channel de-interleaver section, and a channel decoding section. A conventional data processing section is coupled to the channel decoding section. The data processing section can be implemented, for example, with a microprocessor or digital signal processor, for performing desired data processing operations on the data provided by the channel decoding section.

Figure 19:
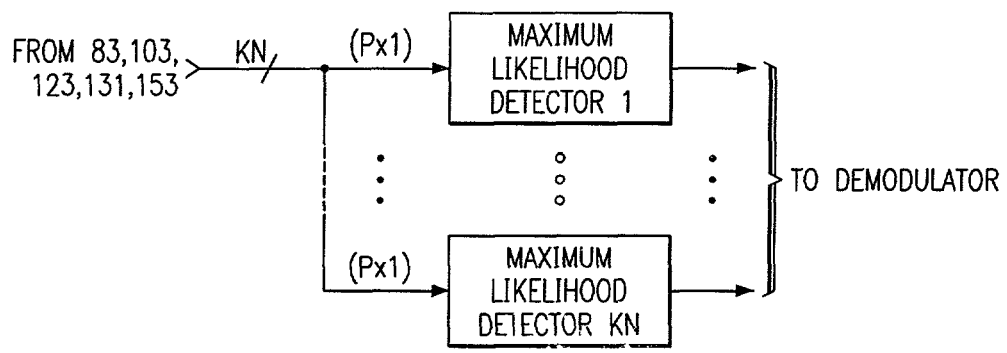
FIG. 19 diagrammatically illustrates pertinent portions of further exemplary embodiments of a wireless CDMA receiver including block isolation and maximum likelihood detection according to the invention.

FIG. 19 diagrammatically illustrates pertinent portions of further exemplary embodiments of a wireless CDMA receiver according to the invention. FIG. 19 illustrates that the KN vectors of dimension P×1 produced by the embodiments of FIGS. 8, 10, 12, 13 and 15 can be input to respective ones of KN conventional maximum likelihood detectors. In such embodiments, the desired interference rejection operation is performed by the maximum likelihood detectors instead of by the successive interference cancellers of FIG. 17.

Figure 20:
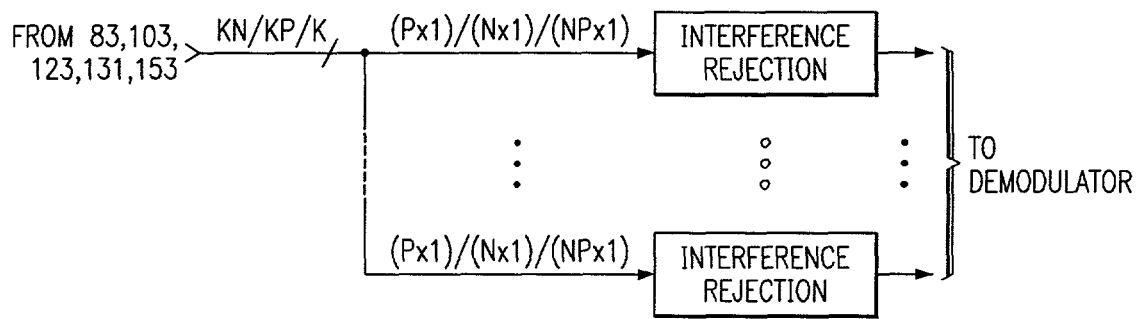
FIG. 20 diagrammatically illustrates pertinent portions of further exemplary embodiments of a wireless CDMA receiver according to the invention.

FIG. 20 diagrammatically illustrates pertinent portions of further exemplary embodiments of a wireless CDMA receiver according to the invention. FIG. 20 illustrates that interference rejection (e.g., successive interference cancellation or maximum likelihood detection) can be applied to vectors of dimension N×1 and NP×1, in addition to the P×1 vectors described above with respect to the aforementioned embodiments. In particular, the separators of the aforementioned embodiments of FIGS. 8, 10, 12, 13 and 15 could perform a separation/isolation operation that causes KP vectors of dimension N×1 to be presented to the interference rejection unit, or could perform a separation/isolation operation that causes K vectors of dimension NP×1 to be presented to the interference rejection unit. The KP vectors of dimension N×1 each correspond to a given user and a given transmit antenna during each of N symbol transmit times, and the K vectors of dimension NP×1 each correspond to a given user during a selected number of symbol transmit times on a selected number of transmit antennas, wherein NP is the product of the selected number of transmit times and the selected number of transmit antennas.

Figure 2:
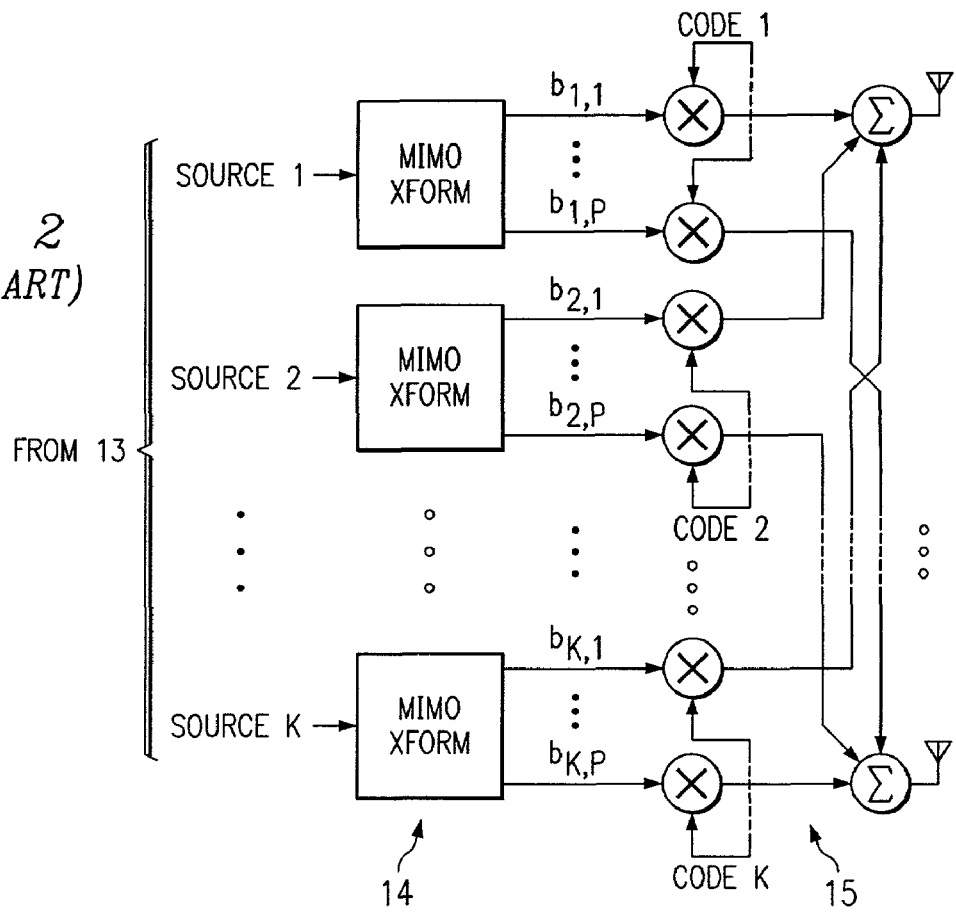
FIG. 2 illustrates a portion of the transmitter of FIG. 1 in more detail.
Figure 3:
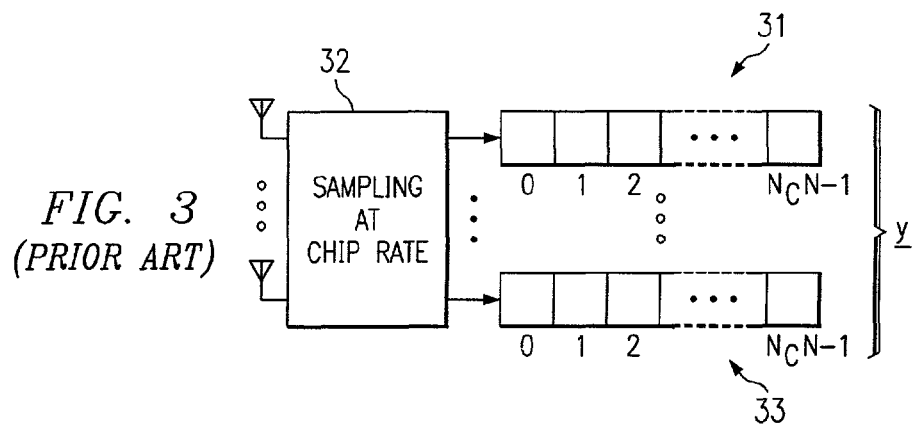
FIG. 3 diagrammatically illustrates a portion of a conventional receiver for receiving symbols transmitted by the transmitter of FIGS. 1 and 2.
Figure 4:
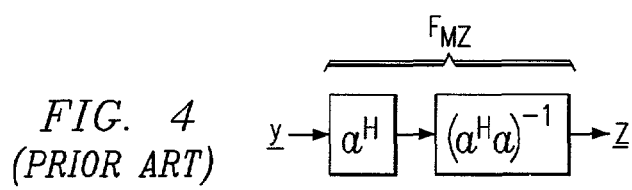
FIG. 4 diagrammatically illustrates conventional multi-user detection with the LZF solution.
Figure 5:
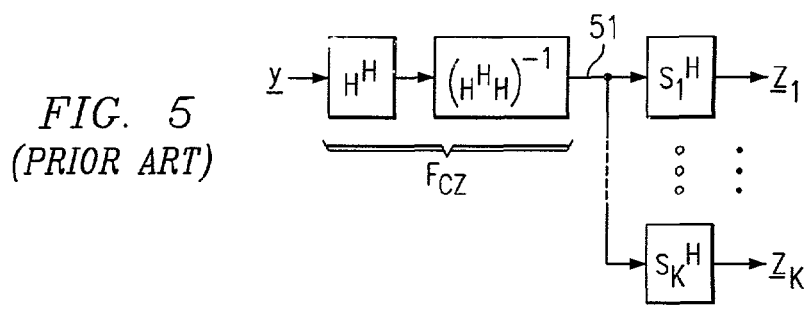
FIG. 5 diagrammatically illustrates conventional chip equalization with the LZF solution.
Figure 6:
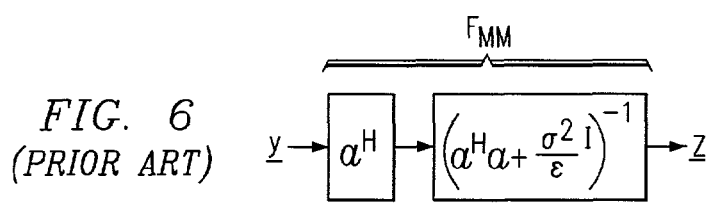
FIG. 6 diagrammatically illustrates conventional multi-user detection with the LMMSE solution.
Figure 7:
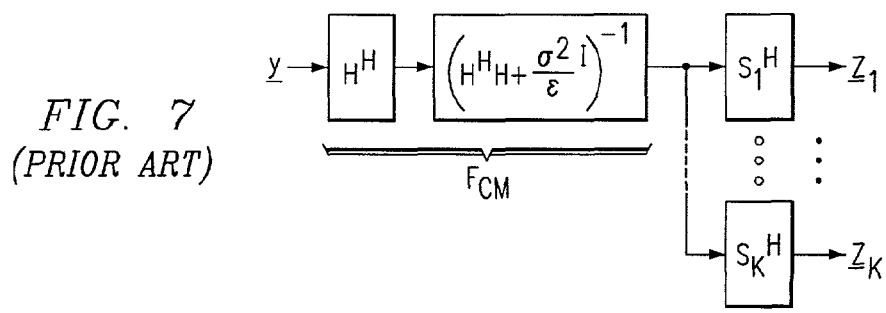
FIG. 7 diagrammatically illustrates conventional chip equalization with the LMMSE solution.

Although the exemplary embodiments illustrated in FIGS. 8-20 assume for clarity of exposition that all of the K information sources of FIG. 2 are of interest to the user equipment represented by the embodiments of FIGS. 8-18, other exemplary embodiments where less than all K sources are of interest to the user equipment are readily and easily implemented by suitable scaling to produce $K_1N$ vectors of dimension P×1 at the input of interference cancellation apparatus 85, where $K_1$ is less than K.

It will be evident to workers in the art that the communication receiver embodiments of FIGS. 8-20 can be readily implemented, for example, by suitably modifying software, or a combination of software and hardware, in conventional wireless communication receivers such as CDMA receivers. Some specific examples of such communication receivers are fixed site wireless communication base stations and mobile wireless communication stations.

Although exemplary embodiments of the invention are described above in detail, this does not limit the scope of the invention, which can be practiced in a variety of embodiments.

What is claimed is:

1. An apparatus for processing a received wireless communication signal, comprising:
  an input for receiving a sample vector which includes a plurality of sample values and which represents a timewise corresponding wireless communication signal portion received via a plurality of receive antennas and produced by a transmitter in which each of a plurality of information sources transmits a plurality of symbols via respective ones of a plurality of transmit antennas during each of a plurality of transmit time intervals associated with said wireless communication signal portion;
  an input processing section coupled to said input for producing from the sample vector a plurality of vectors that are smaller than the sample vector;
  an interference rejection unit coupled to said input processing section for applying an interference rejection operation to each of said smaller vectors individually to thereby decide said symbols;
  wherein said input processing section including a chip equalizer coupled to said input for applying a chip equalization operation to said sample vector to thereby produce a chip equalization result vector;
  wherein said input processing section includes a separator coupled to said chip equalizer for separating said chip equalization result vector into a plurality of intermediate vectors; and
  wherein said input processing section includes a despreader coupled between said interference rejection unit and said separator for applying a plurality of spreading codes to said intermediate vectors to effectuate a despreading operation that produces said smaller vectors.

2. The apparatus of claim 1, wherein said intermediate vectors respectively correspond to said transmit time intervals, and wherein each of said smaller vectors corresponds to a respective one of said information sources during a respective one of said transmit time intervals.

3. The apparatus of claim 1, wherein said intermediate vectors respectively correspond to said transmit time intervals.

4. The apparatus of claim 1, wherein said chip equalization operation includes one of a zero-forcing chip equalization operation and a minimum mean squared error chip equalization operation.

5. The apparatus of claim 4, wherein said interference rejection operation includes one of a successive interference cancellation operation and a maximum likelihood detection operation.

6. The apparatus of claim 5, wherein said successive interference cancellation operation includes one of a zero-forcing successive interference cancellation operation and a minimum mean squared error successive interference cancellation operation.

7. The apparatus of claim 1, wherein said input processing section includes a despreader coupled to said chip equalizer for applying a plurality of spreading codes to said chip equalization result vector to effectuate a despreading operation that produces an intermediate vector.

8. The apparatus of claim 7, wherein said input processing section includes a separator coupled to said despreader for separating said intermediate vector into a plurality of further vectors.

9. The apparatus of claim 8, wherein each said further vector corresponds to a respective one of said information sources during a respective one of said transmit time intervals.

10. The apparatus of claim 8, wherein said further vectors are said smaller vectors.

11. An apparatus for processing a received wireless communication signal, comprising:
  an input for receiving a sample vector which includes a plurality of sample values and which represents a timewise corresponding wireless communication signal portion received via a plurality of receive antennas and produced by a transmitter in which each of a plurality of information sources transmits a plurality of symbols via respective ones of a plurality of transmit antennas during each of a plurality of transmit time intervals associated with said wireless communication signal portion;
  an input processing section, including a chip equalizer coupled to said input for applying a chip equalization operation to said sample vector to thereby produce a chip equalization result vector and a despreader coupled to said chip equalizer for applying a plurality of spreading codes to said chip equalization result vector to effectuate a despreading operation that produces an intermediate vector and a separator coupled to said despreader for separating said intermediate vector into a plurality of further vectors, coupled to said input for producing from the sample vector a plurality of vectors that are smaller than the sample vector; and
  an interference rejection unit coupled to said input processing section for applying an interference rejection operation to each of said smaller vectors individually to thereby decide said symbols, wherein said input processing section further includes a preconditioner coupled between said separator and said interference rejection unit for processing said further vectors to whiten respective noise components thereof and thereby produce a corresponding plurality of preconditioned vectors whose respective noise components are white.

12. The apparatus of claim 11, wherein said preconditioned vectors are said smaller vectors.

13. The apparatus of claim 11, wherein said interference rejection operation includes one of a successive interference cancellation operation and a maximum likelihood detection operation.

14. The apparatus of claim 13, wherein said successive interference cancellation operation includes one of a zero-forcing successive interference cancellation operation and a minimum mean squared error successive interference cancellation operation.

15. The apparatus of claim 11, wherein said input processing section includes a multi-user detector coupled to said input for applying a multi-user detection operation to said sample vector to produce a multi-user detection result vector.

16. The apparatus of claim 15, wherein said input processing section includes a separator coupled to said multi-user detector for separating said multi-user detection result vector into a plurality of further vectors.

17. The apparatus of claim 16, wherein each said further vector corresponds to a respective one of said information sources during a respective one of said transmit time intervals.

18. The apparatus of claim 16, wherein said further vectors are said smaller vectors.

19. The apparatus of claim 15, wherein said multi-user detection operation is one of a zero-forcing multi-user detection operation and a minimum mean squared error multi-user detection operation.

20. The apparatus of claim 19, wherein said interference rejection operation includes one of a successive interference cancellation operation and a maximum likelihood detection operation.

21. The apparatus of claim 20, wherein said successive interference cancellation operation is one of a zero-forcing successive interference cancellation operation and a minimum mean squared error successive interference cancellation operation.

22. The apparatus of claim 11, wherein said interference rejection unit is for applying said interference rejection operation to each of said smaller vectors simultaneously.

23. An apparatus for processing a received wireless communication signal, comprising:
an input for receiving a sample vector which includes a plurality of sample values and which represents a timewise corresponding wireless communication signal portion received via a plurality of receive antennas and produced by a transmitter in which each of a plurality of information sources transmits a plurality of symbols via respective ones of a plurality of transmit antennas during each of a plurality of transmit time intervals associated with said wireless communication signal portion;
an input processing section, including a multi-user detector coupled to said input for applying a multi-user detection operation to said sample vector to produce a multi-user detection result vector and including a separator coupled to said multi-user detector for separating said multi-user detection result vector into a plurality of further vectors, coupled to said input for producing from the sample vector a plurality of vectors that are smaller than the sample vector; and
an interference rejection unit coupled to said input processing section for applying an interference rejection operation to each of said smaller vectors individually to thereby decide said symbols, wherein said input processing section includes a preconditioner coupled between said separator and said interference rejection unit for processing said further vectors to whiten respective noise components thereof and thereby produce a corresponding plurality of preconditioned vectors whose respective noise components are white.

24. The apparatus of claim 23, wherein said preconditioned vectors are said smaller vectors.

25. A wireless communication CDMA receiving apparatus, comprising:
a plurality of receive antennas for receiving a wireless communication signal;
a sampler coupled to said receive antennas for producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;
an input processing section coupled to said sampler for producing from said sample vector a plurality of vectors that are smaller than said sample vector, wherein said input processing section includes a chip equalizer coupled to said input for applying a chip equalization operation to said sample vector to thereby produce a chip equalization result vector and a separator coupled to said chip equalizer for separating said chip equalization result vector into a plurality of intermediate vectors;
an interference rejection unit coupled to said input processing section for applying an interference rejection operation to each of said smaller vectors individually to thereby decide said symbols;
a data extractor coupled to said interference rejection unit for extracting communication data from the symbols decided by said interference rejection unit; and
a data processing apparatus coupled to said data extractor for performing data processing operations on said extracted data; and
wherein said input processing section includes a despreader coupled between said interference rejection unit and said separator for applying a plurality of spreading codes to said intermediate vectors to effectuate a despreading operation that produces said smaller vectors.

26. The apparatus of claim 25, wherein said intermediate vectors respectively correspond to said transmit time intervals, and wherein each of said smaller vectors corresponds to a respective one of said information sources during a respective one of said transmit time intervals.

27. The apparatus of claim 25, wherein said intermediate vectors respectively correspond to said transmit time intervals.

28. The apparatus of claim 25, wherein said input processing section includes a despreader coupled to said chip equalizer for applying a plurality of spreading codes to said chip equalization result vector to effectuate a despreading operation that produces an intermediate vector.

29. The apparatus of claim 25, wherein said interference rejection unit is for applying said interference rejection operation to each of said smaller vectors simultaneously.

30. A wireless communication CDMA receiving apparatus, comprising:
a plurality of receive antennas for receiving a wireless communication signal;
a sampler coupled to said receive antennas for producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;

an input processing section coupled to said sampler for producing from said sample vector a plurality of vectors that are smaller than said sample vector, wherein said input processing section includes a chip equalizer coupled to said input for applying a chip equalization operation to said sample vector to thereby produce a chip equalization result vector;

an interference rejection unit coupled to said input processing section for applying an interference rejection operation to each of said smaller vectors individually to thereby decide said symbols;

a data extractor coupled to said interference rejection unit for extracting communication data from the symbols decided by said interference rejection unit; and a data processing apparatus coupled to said data extractor for performing data processing operations on said extracted data; and wherein said input processing section includes a separator coupled to said despreader for separating said intermediate vector into a plurality of further vectors.

31. The apparatus of claim 30, wherein each said further vector corresponds to a respective one of said information sources during a respective one of said transmit time intervals.

32. The apparatus of claim 30, wherein said further vectors are said smaller vectors.

33. The apparatus of claim 30, wherein said input processing section includes a multi-user detector coupled to said input for applying a multi-user detection operation to said sample vector to produce a multi-user detection result vector.

34. The apparatus of claim 33, wherein said input processing section includes a separator coupled to said multi-user detector for separating said multi-user detection result vector into a plurality of further vectors.

35. The apparatus of claim 34, wherein each said further vector corresponds to a respective one of said information sources during a respective one of said transmit time intervals.

36. The apparatus of claim 34, wherein said further vectors are said smaller vectors.

37. A wireless communication receiving apparatus, comprising:

a plurality of receive antennas for receiving a wireless communication signal;

a sampler coupled to said receive antennas for producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;

an input processing section coupled to said sampler for producing from said sample vector a plurality of vectors that are smaller than said sample vector;

an interference rejection unit including, a chip equalizer coupled to said input for applying a chip equalization operation to said sample vector to thereby produce a chip equalization result vector and including a despreader coupled to said chip equalizer for applying a plurality of spreading codes to said chip equalization result vector to effectuate a despreading operation that produces an intermediate vector and including a separator coupled to said despreader for separating said intermediate vector into a plurality of further vectors and including a preconditioner coupled between said separator and said interference rejection unit for processing said further vectors to whiten respective noise components thereof and thereby produce a corresponding plurality of preconditioned vectors whose respective noise components are white, coupled to said input processing section for applying an interference rejection operation to each of said smaller vectors individually to thereby decide said symbols;

a data extractor coupled to said interference rejection unit for extracting communication data from the symbols decided by said interference rejection unit; and a data processing apparatus coupled to said data extractor for performing data processing operations on said extracted data.

38. The apparatus of claim 37, wherein said preconditioned vectors are said smaller vectors.

39. A wireless communication receiving apparatus, comprising:

a plurality of receive antennas for receiving a wireless communication signal;

a sampler coupled to said receive antennas for producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;

an input processing section, including a multi-user detector coupled to said input for applying a multi-user detection operation to said sample vector to produce a multi-user detection result vector and including a separator coupled to said multi-user detector for separating said multi-user detection result vector into a plurality of further vectors, coupled to said sampler for producing from said sample vector a plurality of vectors that are smaller than said sample vector;

an interference rejection unit coupled to said input processing section for applying an interference rejection operation to each of said smaller vectors individually to thereby decide said symbols and wherein said input processing section includes a preconditioner coupled between said separator and said interference rejection unit for processing said further vectors to whiten respective noise components thereof and thereby produce a corresponding plurality of preconditioned vectors whose respective noise components are white;

a data extractor coupled to said interference rejection unit for extracting communication data from the symbols decided by said interference rejection unit; and a data processing apparatus coupled to said data extractor for performing data processing operations on said extracted data.

40. The apparatus of claim 39, wherein said preconditioned vectors are said smaller vectors.

41. A method of processing a received wireless communication signal, comprising:

receiving a wireless communication signal via a plurality of receive antennas;

producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;

producing from said sample vector a plurality of vectors that are smaller than said sample vector;

applying an interference rejection operation to each of said smaller vectors individually to thereby decide said symbols;

wherein said last-mentioned producing step includes applying a chip equalization operation to said sample vector to thereby produce a chip equalization result vector;

wherein said last-mentioned producing step includes separating said chip equalization result vector into a plurality of intermediate vectors; and wherein said last-mentioned producing step includes applying a plurality of spreading codes to said intermediate vectors to effectuate a despreading operation that produces said smaller vectors.

42. The apparatus of claim 41, wherein said intermediate vectors respectively correspond to said transmit time intervals, and wherein each of said smaller vectors corresponds to a respective one of said information sources during a respective one of said transmit time intervals.

43. The method of claim 41, wherein said intermediate vectors respectively correspond to said transmit time intervals.

44. The method of claim 41, wherein said last-mentioned producing step includes applying a plurality of spreading codes to said chip equalization result vector to effectuate a despreading operation that produces an intermediate vector.

45. The method of claim 41, wherein said last-mentioned producing step includes applying a multi-user detection operation to said sample vector to produce a multi-user detection result vector.

46. The method of claim 45, wherein said last-mentioned producing step includes separating said multi-user detection result vector into a plurality of further vectors.

47. The method of claim 46, wherein each said further vector corresponds to a respective one of said information sources during a respective one of said transmit time intervals.

48. The method of claim 46, wherein said further vectors are said smaller vectors.

49. A method of processing a received wireless communication signal, comprising:

receiving a wireless communication signal via a plurality of receive antennas;

producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;

producing from said sample vector a plurality of vectors that are smaller than said sample vector;

applying an interference rejection operation to each of said smaller vectors individually to thereby decide said symbols;

wherein said last-mentioned producing step includes applying a chip equalization operation to said sample vector to thereby produce a chip equalization result vector;

wherein said last-mentioned producing step includes applying a plurality of spreading codes to said chip equalization result vector to effectuate a despreading operation that produces an intermediate vector; and wherein said last-mentioned producing step includes separating said intermediate vector into a plurality of further vectors.

50. The method of claim 49, wherein each said further vector corresponds to a respective one of said information sources during a respective one of said transmit time intervals.

51. The method of claim 49, wherein said further vectors are said smaller vectors.

52. The method of claim 49, wherein said applying step includes applying said interference rejection operation to each of said smaller vectors simultaneously.

53. The method of claim 49, wherein said interference rejection operation includes one of a successive interference cancellation operation and a maximum likelihood detection operation.

54. A method of processing a received wireless communication signal, comprising:

receiving a wireless communication signal via a plurality of receive antennas;

producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;

producing from said sample vector a plurality of vectors that are smaller than said sample vector; and applying an interference rejection operation to each of said smaller vectors individually to thereby decide said symbols and applying a chip equalization operation to said sample vector to thereby produce a chip equalization result vector and applying a plurality of spreading codes to said chip equalization result vector to effectuate a despreading operation that produces an intermediate vector and separating said intermediate vector into a plurality of further vectors and preconditioning said further vectors, including processing said further vectors to whiten respective noise components thereof and thereby produce a corresponding plurality of preconditioned vectors whose respective noise components are white.

55. The method of claim 54, wherein said preconditioned vectors are said smaller vectors.

56. A method of processing a received wireless communication signal, comprising:

receiving a wireless communication signal via a plurality of receive antennas;

producing a sample vector which includes a plurality of sample values and which represents a timewise corresponding portion of said wireless communication signal, said wireless communication signal portion produced by a transmitter in which each of a plurality of information sources transmits a plurality of symbols via respective ones of a plurality of transmit antennas during each of a plurality of transmit time intervals associated with said wireless communication signal portion;

producing from said sample vector a plurality of vectors that are smaller than said sample vector; and applying an interference rejection operation to each of said smaller vectors individually to thereby decide said symbols and applying a multi-user detection operation to said sample vector to produce a multi-user detection result vector and separating said multi-user detection result vector into a plurality of further vectors and preconditioning said further vectors, including processing said further vectors to whiten respective noise components thereof and thereby produce a corresponding plurality of preconditioned vectors whose respective noise components are white.

57. The method of claim 56, where said preconditioned vectors are said smaller vectors.

* * * * *